US 6,680,908 B1

(12) United States Patent
Gibson et al.

(10) Patent No.: US 6,680,908 B1
(45) Date of Patent: Jan. 20, 2004

(54) NETWORK SWITCH INCLUDING BANDWIDTH ALLOCATION CONTROLLER

(75) Inventors: Patrick Gibson, London (GB); Kam Choi, Tring (GB); Christopher Hay, South Harrow (GB); Gareth E Allwright, Watford (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/416,939

(22) Filed: Oct. 13, 1999

(30) Foreign Application Priority Data

Aug. 4, 1999 (GB) .............................................. 9918245

(51) Int. Cl.⁷ .............................................. G08C 15/00
(52) U.S. Cl. ........................ 370/229; 370/235; 370/413
(58) Field of Search ................................ 370/235, 229, 370/230, 413–419

(56) References Cited

U.S. PATENT DOCUMENTS

| 5,781,801 | A | | 7/1998 | Flanagan et al. ............. 710/56 |
| 6,108,306 | A | * | 8/2000 | Kalkunte et al. ............ 370/235 |
| 6,285,658 | B1 | * | 9/2001 | Packer ....................... 370/229 |
| 6,412,000 | B1 | * | 6/2002 | Riddle et al. ............... 370/235 |
| 6,418,118 | B1 | * | 7/2002 | Hay et al. ................... 370/230 |
| 6,456,590 | B1 | * | 9/2002 | Ren et al. ................... 370/229 |
| 6,493,315 | B1 | * | 12/2002 | Simpson et al. ............ 370/235 |
| 6,496,478 | B1 | * | 12/2002 | Choi et al. .................. 370/229 |

FOREIGN PATENT DOCUMENTS

| AU | A-41300/93 | 12/1993 |
| EP | 0 577 359 A2 | 1/1994 |
| EP | 0 748 087 A1 | 12/1996 |
| EP | 0 577 359 A3 | 4/1998 |
| GB | 2 321 820 A | 8/1998 |
| GB | 2 339 371 A | 1/2000 |

* cited by examiner

Primary Examiner—Chau Nguyen
Assistant Examiner—Keith M. George
(74) Attorney, Agent, or Firm—Nixon & Vanderhye P.C.

(57) ABSTRACT

A network switch includes a plurality of receive ports for receiving addressed data packets and a plurality of transmit ports for forwarding the addressed data packets and structure responsive to data in said the packets for directing received packets to the transmit ports. In respect of at least one of the transmit ports the switch includes an output buffer for storing data packets before they are forwarded from the port and an allocation controller. The allocation controller allocates each packet destined for the buffer and each packet leaving the buffer for the port into at least one of a plurality of categories, which may be based on priority or protocol data and may define traffic types such as video or audio. For each of the categories there is an allocation register for defining a respective selected proportion of the memory space of the output buffer and structure for accumulating a running total of packet sizes, the total being reduced by the size of each packet in the respective category and leaving the buffer for the port. A packet is discarded when the running total of packet sizes for packets of the same category exceeds the respective proportion of the memory space defined in the respective allocation register. The organization of the switch allows the allocation of a minimum bandwidth for each of the categories.

3 Claims, 3 Drawing Sheets

NETWORK SWITCH INCLUDING BANDWIDTH ALLOCATION CONTROLLER

FIELD OF THE INVENTION

The present invention relates to network switches for packet-based communication systems such as Ethernet networks and also to an improved method of operating such a network switch. The term 'switch' is intended to refer broadly to a device which receives data packets at any of a multiplicity of physical 'ports' addressed and which can internally switch those packets so that received packets are forwarded from one or more ports in response to that address data or modified forms of such data. The invention is applicable to a variety of different switch architectures, as indicated hereinafter. The invention is intended to be applicable to both 'bridges' and 'routers'.

BACKGROUND TO THE INVENTION

Broadly, switches of the kind to which the invention relates have a multiplicity of physical ports at which addressed data packets can be received The data traffic, and therefore the occupancy of bandwidth, to any particular port may vary widely. Typically, the switch includes means for temporarily storing packets received by the input ports and means (hereinafter termed 'output buffer') for the temporary storage of data packets before they are forwarded from an output port. Such means might be individual FIFO stores, respective allocated memory space or other forms of memory. The switch includes a forwarding database which is built up typically by reading of source addresses in incoming packets, and permits from an examination of a received packet and recourse to associated data, the determination of each port from which a receive packet should be dispatched. Packets having destination addresses which do not appear in the database need to be 'broadcast' either throughout the whole or part of the network in order to achieve address resolution. Generally, switches which rely on media access control, or layer 2, addresses are termed 'bridges' whereas switch devices which rely on logical link control (layer 3) addresses are termed 'routers'.

In almost all switches of this general kind, there is a conflict of bandwidth requirements of different types of packet In any practical system, the buffer space available for the transmit ports of a switch is limited and accordingly switches in practice are inherently liable to congestion.

Various techniques are currently used to bridge and or route data packets of different type. These techniques generally rely on the individual packets protocols or priorities to influence the speed of transmission through the switch and/or to determine whether the packet will be discarded if the device becomes congested. Generally, packets of higher priority experience the lower rate of discard. However, when and how many packets of each priority are discarded depends on a variety of factors such as the state of congestion of the switch at the time of discard, the priority algorithm which is used and so on. Thus the output bandwidth occupied by each type may range from zero (when all the packets are discarded) to full (with no discard). In practice, whether any given packet is forwarded across a switch to an output buffer and is forwarded from the respective port actually depends on whether that buffer is already full. Fullness of a buffer is customarily presumed to exist when the buffer reaches a state of fullness which is less than the total physical memory space allocated to an output queue of packets.

For a variety of traffic, such as voice data, the possibility that, at least temporarily, there might be no bandwidth available for the transmission of the respective data and that packets are discarded is undesirable.

The object of the present invention is to provide for at least one type of traffic, as denoted by relevant data within the packets, a minimum bandwidth in an output link.

SUMMARY OF THE INVENTION

In a preferred form of the invention, bandwidth allocation for each defined packet type is achieved using a single buffer memory space. Different categories of packet are selected by (preferably) examination of protocol fields and/or priority fields in packets received by the switch. Each selected category is preallocated a minimum proportion of the total available output bandwidth. This is equated to the same proportion as the number of bytes of the total transmit port's buffer size. Thus for example if the total bandwidth available on a link to which data is forwarded from the buffer is 1 Gigabit per second and a packet of given category is allocated one tenth of the available bandwidth, then its minimum bandwidth allocation will be 100 megabits per second. If the total transmit port's buffer space is, for example, 100 kilobytes, then one tenth of the buffer space, in this case 10 kilobytes, of the buffer space is reserved for packets of that category. As packets of the different categories are written into the buffer, a running accumulation may be kept of the total bytes allocated for the various types. Similarly, as packets of a given category are emptied from the buffer, by forwarding over the associated link, the running accumulation of the packet sizes of that category is decremented according to the bytes of the output packets. Thereby the total byte count for a given packet category is known continuously. Before a new packet can be written into the buffer, the accumulated total is compared with the allocated value and a decision made whether to discard or retain the packet. If the respective accumulated total is less than the respective allocated number, the packet will be allowed into the buffer because the packet type has reserved bandwidth available. However, if the respective accumulated amount exceeds the respective allocated number, the packet will be discarded. Restricting the packet categories to a percentage of the buffer size is in effect reserving minimum bandwidth for each category under congested conditions.

It will be appreciated that in general according to the invention packets of the different categories will be intermixed within a single buffer. Discarding packets only after they exceed the respective allocation of bytes within the output buffer not only ensures that a minimum bandwidth is guaranteed for at least each packet category in congested units, but also, under non-congested conditions, the actual bandwidth used by a packet category can exceed its allocation because it may still use up to the maximum available bandwidth on the link provided that the buffer quota is not exceeded.

It may be necessary, if lower latency is required for certain packet categories, to employ two or more buffers to constitute the allocated memory space.

The invention will be more particularly described in the following with reference to the accompanying drawings.

DETAILED DESCRIPTION OF A PREFERRED EMBODIMENT

Figure 1:
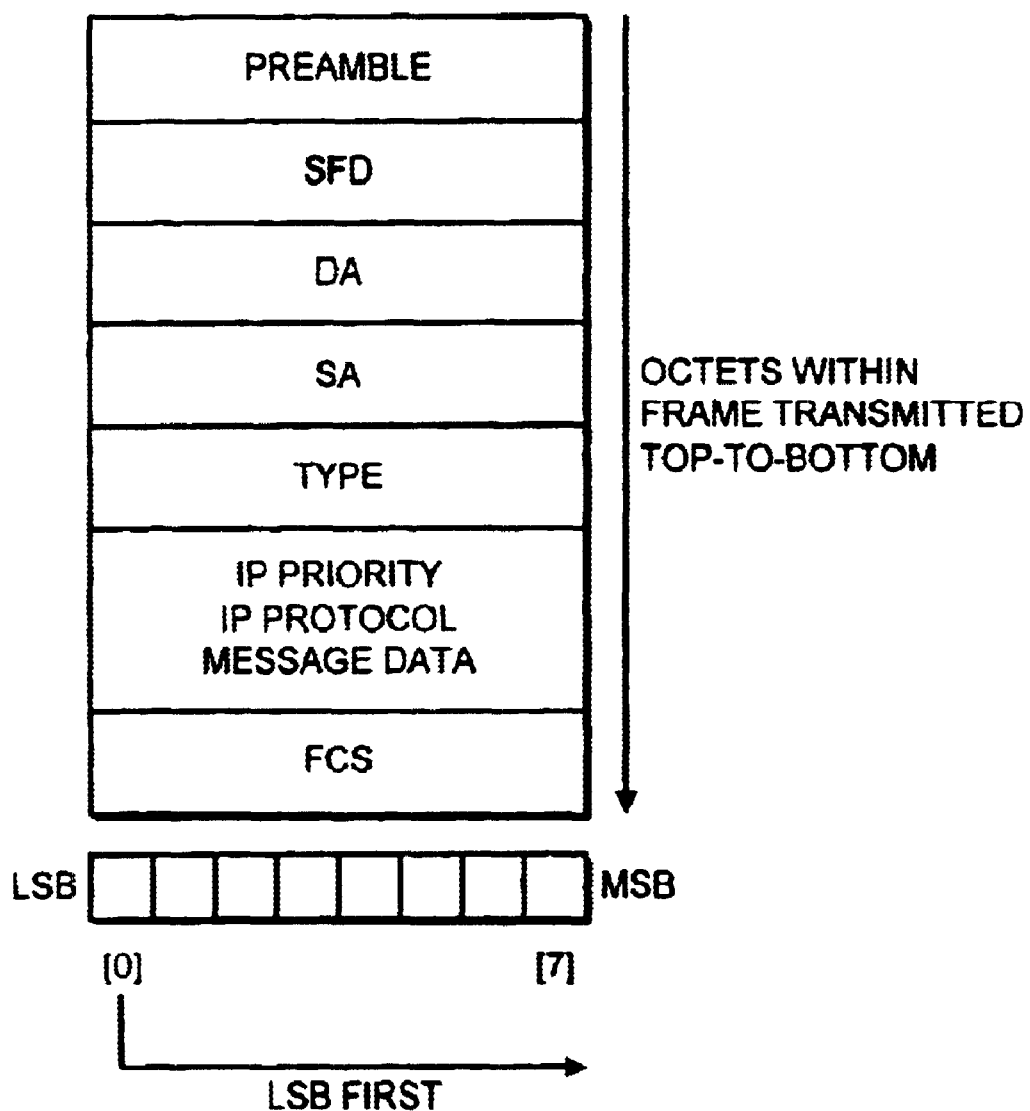
FIG. 1 illustrates a typical 'Ethernet' data packet.

FIG. 1 illustrates a typical 'Ethernet' data packet or frame of a kind which would be used by switches according to the invention. Such a packet is intended to conform, for example, to the IEEE Standard 802.3 (1998) but may conform to other and modified standards if desired.

The data packet or frame illustrated in FIG. 1 customarily has a header comprising a preamble, a starter frame delimiter, a destination address (DA), a source address (SA), and type data, followed by packet data comprising an IP header and message data. Frame check sum or cyclic redundancy code data occurs at the end of the packet Other forms of packet or frame which may be employed, such as control frames, may have special destination address codes and in place of the type data may have operation codes followed by control parameters. Control frames need not include message data but will normally include cyclic redundancy code data.

It is necessary in the present invention to allocate all the packets which need to be forwarded from a given port to one or another of a plurality of categories. These categories may be, for example, audio data packets, video data packet and all other packets. The allocations may be made by examination of source and or destination addresses, protocol data or priorities according to circumstances.

There are many ways in which packets may be categorised and it is not intended to limit the invention to any particular group of categories or types of any particular method of categorisation. A few examples will suffice.

One example is to employ layer 2 (media access control) priority bits and layer 3 (logical link control) priority bits. According to IEEE Standard 802.1p there are three priority bits used to define priority in layer 2 addressing, the bits being located after the destination and source addresses and type field. The layer 3 priority bits are located in the layer 3 IP header. These various priority bits may be combined using a mapping algorithm to yield (for example) a three bit category field defining eight different categories. Each packet will fall into at least one category it is not essential that the categories be mutually exclusive.

A second example of categorisation is to employ different layer 3 protocols, e.g. IP and IPX. As will be apparent later, this would require the system described later to employ three allocation registers, one each for LP and IPX traffic and one for traffic which is neither IP nor IPX traffic.

If, as also envisaged according to the invention, it is desired to employ a 'higher level' categorisation, between audio, video and data traffic, then the categorization or filtration needs to provide translation, e.g. by assigning different priorities to the different categories. However, such methods of categorisation are known in the art and at the choice of the designer or dependent on the circumstances.

It is necessary according to the invention to ascertain the size of each packet. This could be achieved by the (known) operation of snooping or parsing the packet header if the packet (as originally prescribed for Ethernet packets) the 'type' field included an indication of the length of the packet. More commonly the type field is used to represent an IP type and does not include length data. Thus, as indicated later, it is preferable to obtain the size of each packet as it is stored in a temporary buffer.

Figure 2:
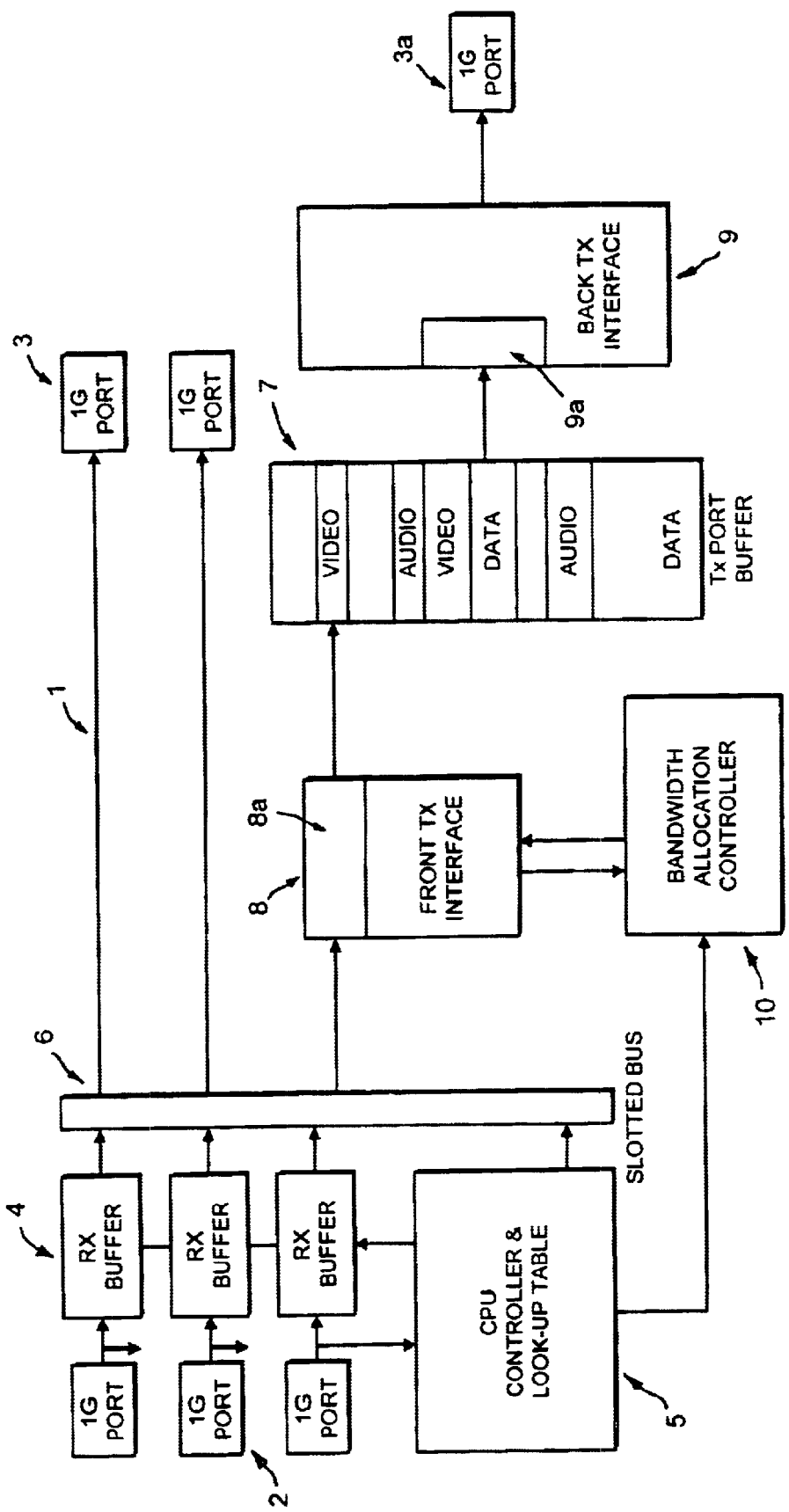
FIG. 2 illustrates schematically a switch architecture for a switch organised according to the invention.

FIG. 2 illustrates by way of example the architecture of a network switch 1 operable in accordance with the invention.

The switch 1 which has a set of ports 2 receiving addressed packets such as Ethernet packets as shown in FIG. 1. Only three ports 2 are shown though very typically there are many more ports than three and also typically the ports are capable of bidirectional operation, namely they can transmit as well as receive. For the sake of simplicity however the ports 2 are shown as receiving ports and further ports 3 are shown as transmitting ports. In this example, each of the ports is associated with a data link which, in this example, is assumed to have a maximum data rate of one gigabit per second. That is not a limitation on the invention; as well be apparent, the invention is applicable to a variety of data rates.

In the present example, it will be assumed that one of the ports, denoted 3a in FIG. 2, is required to provide over an associated link a guaranteed minimum bandwidth for each of the different categories of packet, identified herein as 'video', 'audio' and 'data' respectively. These categories may be defined and distinguished as discussed above. As will be apparent, the invention is applicable in general to any reasonable multiplicity of different categories of data packets. Moreover, each of the other ports 3 may be similarly provided with a bandwidth allocator of the kind described but for convenience the description will be limited to the allocation of guaranteed bandwidth for different types of traffic intended for transmission over the one gigabit/second link associated with the transmit port 3a.

Before the important features of the invention are described, the general architecture of the switch will be reviewed.

Packets received at each of the ports 2 are temporarily stored in receive (RX) buffers 4 from which they may be distributed to their destination ports by any convenient means. In this example, the receive buffers 4 provide packets under the control of an access controller 5 to a time slotted data bus 6 which provides equal access time for each of the receive buffers. From the data bus 6 packets are delivered to the transmitting ports as required. Packets intended for the port 3a are directed to a respective buffer memory 7 which is under the control of a front TX interface 8 and a back TX interface 9. All the ports (3 and 3a) are allotted 'port numbers' and the distribution of port numbers to packets is achieved in known manner by the access controller 5 which includes, in known manner, a CPU and a look-up table which identifies the port numbers with destination addresses.

The organisation of the look-up table and the allocation of port numbers is not of any consequence to the invention. Typically, a hashing algorithm may be applied to at least part of the address data in the receive packets and preferably on a combination of the source address and destination address in each packet. The hashing of the source and destination addresses will provide a pointer to an entry or series of linked entries in a look-up table, which typically contains entries each comprising at least a port number and usually the source and destination addresses for the purposes of verification with also a link pointer to other entries in the table obtained from different source and destination pairs but hashing to the same result, so that if a verification process made on an entry does not achieve a match of address data the next entry in a link list can be examined and so on. This process is typical of look-ups for forwarding tables based on hashing of addresses and does not need to be described in further detail. One example of hashing is described in U.S. Pat. No. 5,708,659 to Rostoker et al issued Jan. 13, 1998.

In any event, those packets which are allotted port numbers corresponding to any of the ports 3 or 3a will, after leaving the relevant receive (RX) buffer, be conveyed across the switch by way of the slotted bus 5 to the relevant ports.

The memory space 7 may be a respective memory for the port but may be constituted by respectively allocated buffers in a large buffer store, constituted for example by dynamic random access memory. The front transmit interface 8 controls the writing of data into the available memory space in the buffer 7 whereas the back TX interface 9 controls the readout of packets from the buffer memory.

It needs to be stated that there is a variety of techniques available for the writing and reading of the data packets in the output buffer 7. For example, as described in the earlier patent application for Gibson et al, Ser. No. 09,353,149, filed Jul. 4, 1999, incorporated herein by reference it is possible for the front TX interface to form a multiplicity of transmit queues in the available data space, according to traffic type, and for the back TX interface to read out from each of the thereby defined transmit queues in turn. However, for simplicity it will be assumed that the front TX interface forms within the available space of the TX port buffer a single queue of packets which will be read out from the buffer 7 by means of the back TX interface 9.

As thus far described the switch conforms to generally known switches. The invention is not limited to the specific architecture shown provided that there are, as indicated in FIG. 2, some means for forming the address data packets into at least one queue in output buffer space before the packets are transmitted by way of a respective port (or group of trunked ports).

As mentioned previously, in this embodiment of the invention, each of three packet categories, namely video, audio and ordinary message data is allocated, as will be described with reference to FIG. 3, a respective proportion of the total size of the buffer 7. In the present example, video traffic is allocated 60%, audio traffic 10% and other traffic 30% of the available space in the buffer. It should be remarked that the 'available' space need not correspond to the maximum physical space in the buffer although it would be customary for this to be so.

The switch 1 includes an allocation controller 10 which is more particularly described with reference to FIG. 3, the controller 10 reads the early part of each packet stored in a temporary buffer 8a in the front Tx interface and performs a similar operation on each packet leaving the Tx port buffer 7 and stored in a temporary output buffer 9a in the Back Tx interface 9. Thereby the controller obtains, for each packet, an identification of the category (video, audio or other) and an indication of the packet size, which may be numerically specified in bytes or octets. The data concerning the traffic category may be achieved from a reading of the relevant protocol data (IP, IPX) or priority data (in layer 2 or layer 3 terms). It may be possible, though is not normally desirable, to employ address data in categorizing packet types.

It needs finally to be mentioned before FIG. 3 is discussed, to note that a front TX interface such as interface 8 customarily includes a discarding function by which the TX port buffer 7 is prevented from accepting any further packets. In known systems, such a function may be initiated by watermarks or thresholds on a transmit queue and comprises signalling the front TX interface when a traffic queue is longer than some defined length FIG. 3 illustrates one channel of an allocation controller 10. FIG. 3 illustrates only the allocation controller channel for traffic of a particular category and it will be apparent that there will be a channel according to FIG. 3 for each category (however defined) of packet destined for the port 3a. Some parts of the channels may be common to more than one channel for example the packet selection or filtering may be performed by a single unit that provides controls for the various channels.

Figure 3:
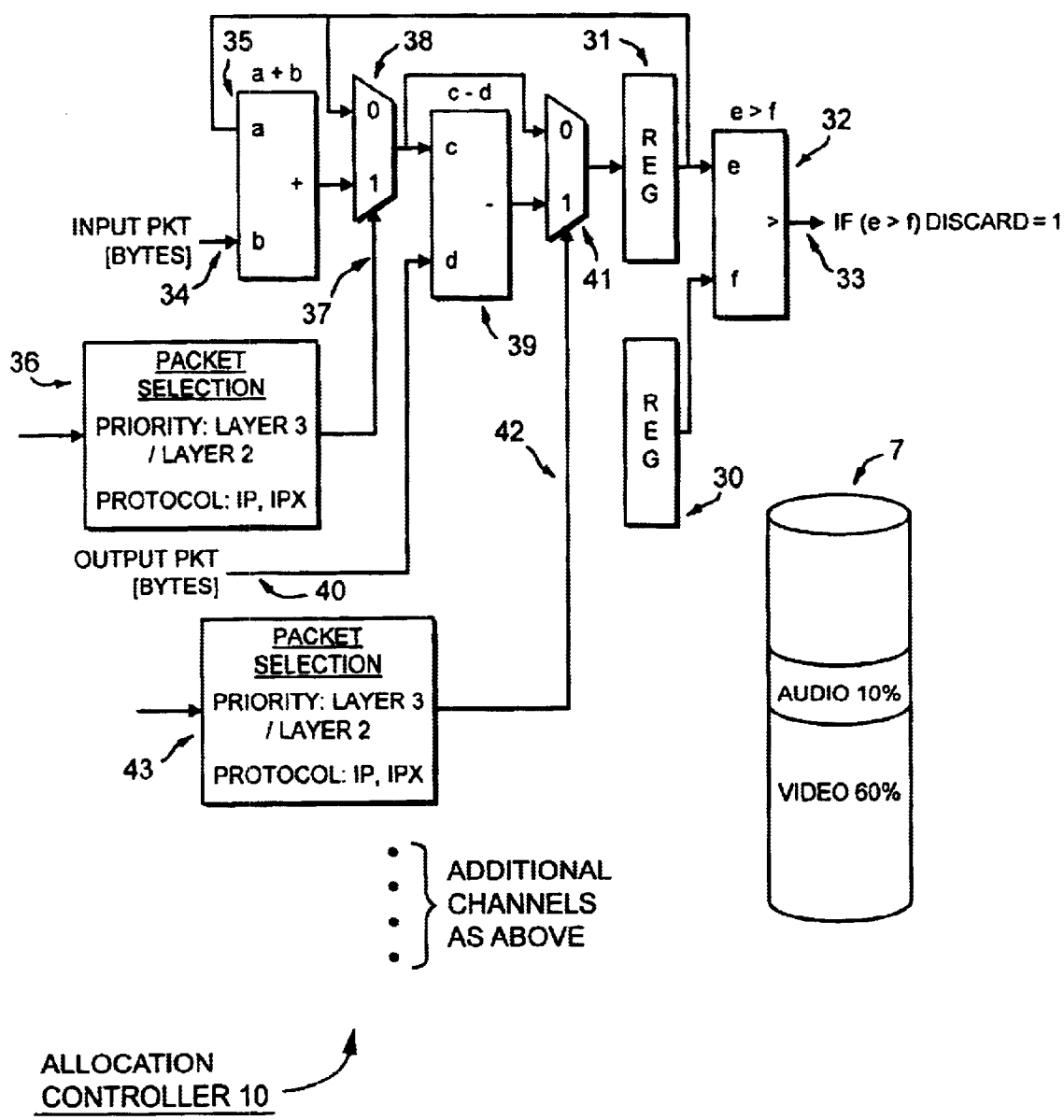
FIG. 3 illustrates one channel of a bandwidth allocator forming part of the switch illustrated in FIG. 2.

The controller shown in FIG. 3 includes a register 30 which is programmed with a number representing, in terms of the size of the buffer 7, the percentage allocation of bandwidth to the packets of the respective category in the link coupled to output port 3a. Thus for example where the respective controller in FIG. 3 is for the 'video' traffic, which in this example is presumed to have an allocation of 60% of the bandwidth available to the port 3a, and on the assumption that the size of the buffer 7 (shown in FIG. 3 for convenience) is 100 kilobytes, the register 30 is programmed with a number representing 60 kilobytes.

The allocation controller for the video traffic, shown in FIG. 3, also includes a register 31, which contains a number representing the number of bytes currently in the buffer 7 for the selected packet category. The contents of the registers 30 and 31, denoted e and f respectively, are compared by a comparator 32 to generate on line 33 a control signal if the number of bytes currently in the buffer for the selected packet category exceeds the allocated number. The signal on line 33 initiates discard of the packet which would otherwise by caused to enter the output buffer 7 by way of the front TX interface 8.

It will be apparent that provided the content of the resister 31 remains below that of register 30, as will occur in a non-congested state of the output buffer, it is possible in an non-congested state of the switch, where the content of the register 31 remains below that of register 30, for all the available bandwidth to be occupied by the video traffic.

Packets presented for entry into the buffer are examined by the allocation controller in respect of the packet size (expressed in bytes) and the packet category so as to provide a numerical input (b) on a line 34 to an adder 35 and a control input from a selector or filter 36 on line 37 to a multiplexer 38. The adder 35 receives an input (a) corresponding to the current content of register 31 as does one of the inputs of the multiplexer 38.

Further, the selected output of multiplexer 38 is coupled to an input of a subtractor 39, which receives at a second input on line 40 an indication of the size of an output packet. The sum (a+b) is coupled to one (default) input of a multiplexer 41 which receives the result (c−d) from subtractor 39 at another input and selects the latter input in preference to the former in response to a control signal on a line 42 from a selector or filter 43 which determines whether the packet output from the buffer is of the selected category.

In operation, the adder 35 forms the sum of the accumulated packet sizes in register 31 and the size of the current input packet and provides an output for one input of multiplexer 38 The other input to this multiplexer is the current accumulation of packet sizes in register 31. Thus, if the input packet is of the video category, the output from multiplexer 38 will be the previously accumulated packet size count augmented by the size of the input packet (preferably in bytes). If the input packet is not of the video category, the output from multiplexer 38 will be the current accumulation of register 31.

Similarly, subtractor 39 forms the difference between either the current content of the register (or the content as it is about to be augmented by an input packet) depending on the output of the multiplexer 38 and decrements by the output packet size of the packet currently leaving the output buffer. If the output packet is of the video category, the multiplexer 43 selects either the current or expected content of register 31 and feeds it to the register 31.

The point of the particular arrangement in FIG. (3) is that incrementing of the register 31 in accordance with the size of an input packet and the decrementing of the register 31 by the size of an output packet, assuming those packets are of the category for which the register holds the respective accumulation, can occur, ideally, with minimum temporal separation.

What is claimed is:

1. A network switch comprising a plurality of receive ports for receiving addressed data packets and a plurality of transmit ports for forwarding the addressed data packets and means including a look-up table relating address data in said packets to the transmit ports, said switch including, in respect of at least one of said transmit ports:

an output buffer for storing data packets before they are forwarded from said port, said output buffer having a front interface which controls the writing of packets into said buffer and a back interface which controls the reading of packets from said buffer; and an allocation controller which includes:

means responsive to data in said packets for allocating each packet destined for the said buffer into at least one of a plurality of categories;

means responsive to data in said packets for allocating each packet leaving said output buffer into at least one of said plurality of categories;

means for determining the size of each packet destined for the output buffer and the size of each packet leaving the output buffer for said port, each of said front and back interfaces including a respective buffer for the temporary storage of packets while they are categorised by said allocation controller;

for each of said categories, an allocation register for defining a respective selected proportion of the memory space of said output buffer;

for each of said categories, means for accumulating a running total of packet sizes, said total being increased by the size of each packet in the respective category and destined for said output buffer and said total being reduced by the size of each packet in the respective category and leaving said output buffer for the said port; and means for causing discard of a packet when the running total of packet sizes for packets of the same category exceeds the respective proportion of the memory space defined in the respective allocation register.

2. A network switch according to claim 1 wherein said categories are based on protocol and/or priority data in said packets.

3. A network switch according to claim 1 wherein said means responsive to data in said packets includes a look-up table relating address data in said packets to transmit ports of the switch.

* * * * *